3,200,090
STABILIZATION OF OXYMETHYLENE
POLYMERS WITH PROTEINS
Thomas J. Dolce and Donald E. Hudgin, Summit, N.J., assignors to Celanese Corporation of America, New York, N.Y., a corporation of Delaware
No Drawing. Filed Sept. 9, 1959, Ser. No. 838,832
16 Claims. (Cl. 260—6)

This invention relates to polymers which are structurally related to polyoxymethylene and particularly to polymers of high thermal stability. This invention also relates to a method for improving the thermal stability of polymers.

Polyoxymethylene polymers, having recurring

—CH$_2$O— units have been known for years. They may be prepared by the polymerization of anhydrous formaldehyde or by the polymerization of trioxane which is a cyclic trimer of formaldehyde. Polyoxymethylene varies in thermal stability and in molecular weight, depending on its method of preparation.

High molecular weight polyoxymethylene have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds, as described in application Serial No. 691,143, filed October 21, 1957 by Hudgin and Berardinelli.

Although polyoxymethylenes prepared by some methods are much more stable against thermal degradation than those prepared by other methods, it is nevertheless desirable for many uses that the thermal stability be increased.

In accordance with one aspect of the present invention the heat stability of oxymethylene polymers is enhanced by the incorporation into the polymer structure of oxyalkylene groups having adjacent carbon atoms and the blending of the polymers with proteins.

Typical proteins which may be used include gelatin, glue, casein, albumins, globulins, glutelins and keratins. The proteins may be in their natural state or they may be chemically modified for better solubility as by partial hydrolysis with acids, bases, or enzymes.

In accordance with this aspect of the invention, the aforesaid protein is blended into a copolymer containing oxymethylene groups and oxyalkylene groups having adjacent carbon atoms, and particularly copolymers containing from 60 to 99.6 mol percent of recurring oxymethylene groups. It appears that the susceptibility of oxymethylene polymers to thermal stabilization by the addition of the aforementioned proteins is enhanced by incorporating into the polymer oxyalkylene units having adjacent carbon atoms and derived from cyclic ethers having adjacent carbon atoms.

Among the copolymers which are utilized in accordance with this invention are those having a structure comprising recurring units having the formula (—O—CH$_2$—(C)$_n$—)

wherein $n$ is an integer from zero to 5 and wherein $n$ is zero in from 60 to 99.6 percent of the recurring units.

A preferred class of copolymers are those having a structure comprising recurrent units having the formula [—O—CH$_2$—(CH$_2$)$_n$—] wherein $n$ is integer from zero to 2 and wherein $n$ is zero in from 60 to 99.6 percent of the recurring units. These copolymers are prepared by copolymerizing trioxane with a cyclic ether having the structure

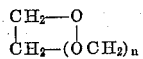

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran and butadiene monoxide.

The preferred catalysts used in the preparation of the desired copolymers are the boron fluoride coordinate complexes with organic compounds in which oxygen or sulphur is the donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is the preferred coordinate complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air will not prevent polymerization, but should be essentially removed for best yields.

In a specific embodiment of this invention, the trioxane, cyclic ether and catalyst are dissolved in a common anhydrous solvent, such as cyclohexane, and permitted to react in a sealed reaction zone. The temperature in the reaction zone may vary from about 0° C. to about 100° C. The period of reaction may vary from about 5 minutes to about 72 hours. Pressures from subatmospheric to about 100 atmospheres, or more may be used, although atmospheric pressure is preferred.

It has been found that the relatively minor amounts of the cyclic ether other than trioxane used in the copolymerization reaction generally disappears completely from the reaction mixture. The required ratio of trioxane to cyclic ether in the reaction mixture may therefore be roughly predetermined for a desired mol ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers in accordance with this invention have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in copending application Ser. No. 718,147, filed February 28, 1958 by Donald E. Hudgin and Frank M. Berardinelli.

In accordance with another aspect of this invention the oxymethylene polymer contains both a protein and a bisphenol-substituted alkane as a combination thermal stabilizer. It appears that the stabilization action of the proteins and of the bisphenol-substituted alkanes enhance each other so that a mixture of a stabilizer of each class is more effective than a comparable amount of stabilizer of either class, by itself.

A suitable class of bisphenol-substituted alkanes includes compounds having from 1 to 4 carbon atoms in the alkane group and having from zero to 2 alkyl substituents on each benzene ring, each alkyl substituent having from 1 to 4 carbon atoms. The preferred bisphenol-substituted alkanes are 2,2'-methylene bis-(4-methyl-6-tertiary butyl phenol) and 4,4'-butylidene bis-(6-tertiary butyl-3-methyl phenol).

The protein is generally admixed with the oxymethylene polymer in amounts not exceeding 10%, based on the weight of the oxymethylene polymer, and preferably in amounts between about 2 and 0.10 weight percent. The bisphenol-substituted alkane is admixed in amounts not exceeding 10 weight percent and preferably from about 2 to about 0.10 weight percent.

The proteins, and the bisphenol-substituted alkanes, if desired, may be admixed intimately with the oxymethylene polymer by being applied in solution in a suitable solvent to the finely divided solid oxymethylene polymer followed by evaporation of the solvent when desired, or when there is no single suitable solvent for both stabilizers, the stabilizers may be applied successively, each in its own solvent with drying between applications. Water, dilute acids and dilute bases are suitable solvents for many proteins. The stabilizers may also be applied in fine dispersions. When separate solutions of the stabilizers, each in its own solvent, are admixed, one or both of the stabilizers may be insoluble in the mixed solvent but would nevertheless be sufficiently finely dispersed to be suitable for application to the polymer.

The admixture may also be made by dry blending the finely divided oxymethylene polymer and finely divided stabilizers or by milling the stabilizers into the polymer as the latter is worked on a rubber mill. In the latter case, if the protein is one of those which coagulates when heated, it should be finely divided and uniformly dispersed before milling.

The compositions of this invention may also include, if desired, plasticizers, fillers, pigments and other stabilizers, such as benzophenone derivatives which are stabilizers against degradation by ultra violet light. The oxymethylene polymer may be stabilized against degradation by ultra violet light by the addition, for example, of about 1% by weight of 2,2'-dihydroxy-4,4' dimethoxybenzophenone.

*Example I*

2100 g. of trioxane was dissolved in 900 g. of cyclohexane at 60° C. 52.5 g. of dioxolane was added and to this solution was added a solution of 0.63 ml. of $BF_3$ dibutyl etherate in 20 ml. of cyclohexane. The solution became slightly turbid, was stirred for 4 min. at 60° C. It was then poured into a sigma blade mixer where reaction was allowed to proceed at 60–64° C. for 1½ hrs. The mixture was then poured into a solution of 3 ml. of tributylamine in 3 liters of acetone and washed. The polymer was washed twice more with acetone and dried in an oven at 60–65° C. for several hours. The yield was 63.2% and the dioxolane content of the polymer was 3.9%.

A solution of 0.06 g. of purified calfskin gelatin in about 15 ml. of water was added to 3 g. of the above polymer. The solvent was evaporated with stirring and the polymer was dried overnight in an oven at 65 to 70° C. A tough disc was compression molded for 4 minutes at 190° at a pressure of 1500 p.s.i. The degradation rate of the polymer in terms of weight lost when maintained in an open vessel in a circulating air oven at 222° C. was 0.47 wt. percent/min. The degradation rate of the untreated copolymer was 2.5 wt. percent/min.

*Example II*

A solution of 0.03 g. of purified calfskin gelatin in about 15 ml. of water and a solution of 0.03 g. of 2,2'-methylene-bis-(4-methyl-6-tertiary butyl phenol) in about 15 ml. of methanol were both applied as above to the copolymer of Example I. The mixed solvent was evaporated and the polymer was dried as in Example I. A disc was compression molded under the conditions of Example I. The degradation rate of the disc at 222° C. was 0.16 wt. percent/min. for the first 4.5% of polymer and 0.07 wt. percent/min. for the remainder.

It is to be noted that the polymer of Example II wherein a combination of stabilizers was used had a substantially better thermal stability than the polymer of Example I despite the fact that the total stabilizer weight was the same.

It is to be understood that the foregoing detailed description is given merely by way of illustration and that many variations may be made therein without departing from the spirit of our invention.

Having described our invention what we desired to secure by Letters Patent is:

1. A polymer composition comprising an admixture of a normally solid, water-insoluble, moldable oxymethylene polymer and a stabilizing amount of up to 10% of a protein, said oxymethylene polymer containing oxyalkylene groups having more than one carbon atom and containing from 60 to 99.6 mol percent of oxymethylene groups.

2. An admixture of a normally solid, water-insoluble, moldable polymer composition comprising an oxymethylene polymer and from 2 to 0.10 weight percent of a protein, based on the weight of polymer, said oxymethylene polymer containing oxyalkylene groups with more than one carbon atom and containing from 60 to 99.6 mol percent of oxymethylene groups.

3. An admixture of a normally solid, water-insoluble moldable polymer composition comprising an oxymethylene polymer, up to 10% based on the weight of the oxymethylene polymer of a bisphenol-substituted alkane and up to 10% based on the weight of the oxymethylene polymer of a protein.

4. An admixture of a normally solid, water-insoluble, moldable polymer composition comprising an oxymethylene polymer, from 2 to 0.10 weight percent of a bisphenol-substituted alkane and from 2 to 0.10 weight percent of a protein, both based on the weight of polymer.

5. The polymer composition of claim 1 wherein said protein is gelatin.

6. The polymer composition of claim 1 wherein said protein is casein.

7. The polymer composition of claim 1 wherein said protein is albumin.

8. The polymer composition of claim 1 wherein said protein is glue.

9. The polymer composition of claim 4 wherein said bisphenol-substituted alkane has 1 to 4 carbon atoms in the alkane group and from zero to two alkyl substituents on each benzene ring, each alkyl substituent having from 1 to 4 carbon atoms.

10. The polymer composition of claim 9 wherein said bisphenol-substituted alkane is 2,2'-methylene-bis (4-methyl-6-tertiary butyl phenol).

11. The polymer composition of claim 9 wherein said bisphenol-substituted alkane is 4,4' butylidene-bis (6-tertiary butyl-3-methyl phenol).

12. The method of stabilizing a normally solid, water-insoluble, moldable oxymethylene polymer which comprises intimately admixing therewith a protein and a bisphenol-substituted alkane.

13. The method of stabilizing a normally solid, water-insoluble, moldable oxymethylene polymer containing oxymethylene groups and oxyalkylene groups containing more than one carbon atom and containing from 60 to 99.6 mol percent of oxymethylene groups which comprises intimately admixing therewith up to 10% by weight of a protein.

14. The method of claim 12 wherein from 2 to 0.10 weight percent of protein and 2 to 0.10 weight percent of bisphenol-substituted alkanes are admixed with said polymer.

15. The method of claim 12 wherein said protein and said bisphenol-substituted alkanes are applied in solution to said oxymethylene polymer in finely divided state with subsequent evaporation of the solution solvent.

16. The method of claim 12 wherein said protein and said bisphenol-substituted alkanes are compounded in a mill with said oxymethylene polymer in plastic state.

References Cited by the Examiner

UNITED STATES PATENTS

| | | | |
|---|---|---|---|
| 2,296,249 | 9/42 | Austin et al. | 260—67 |
| 2,457,224 | 12/48 | Gresham | 260—67 |
| 2,475,610 | 7/49 | Gresham et al. | 260—338 |
| 2,625,569 | 1/53 | Gresham et al. | 260—67 |
| 2,871,220 | 1/59 | McDonald | 260—45.95 |
| 2,989,509 | 6/61 | Hudgin et al. | 260—67 |

WILLIAM H. SHORT, *Primary Examiner.*

D. ARNOLD, A. D. SULLIVAN, MILTON STERMAN, LEON J. BERCOVITZ, *Examiners.*